J. E. ANGELL.
ELECTRICAL CHEMICAL TESTING SYSTEM.
APPLICATION FILED APR. 19, 1909.
1,089,030.
Patented Mar. 3, 1914.
2 SHEETS—SHEET 1.
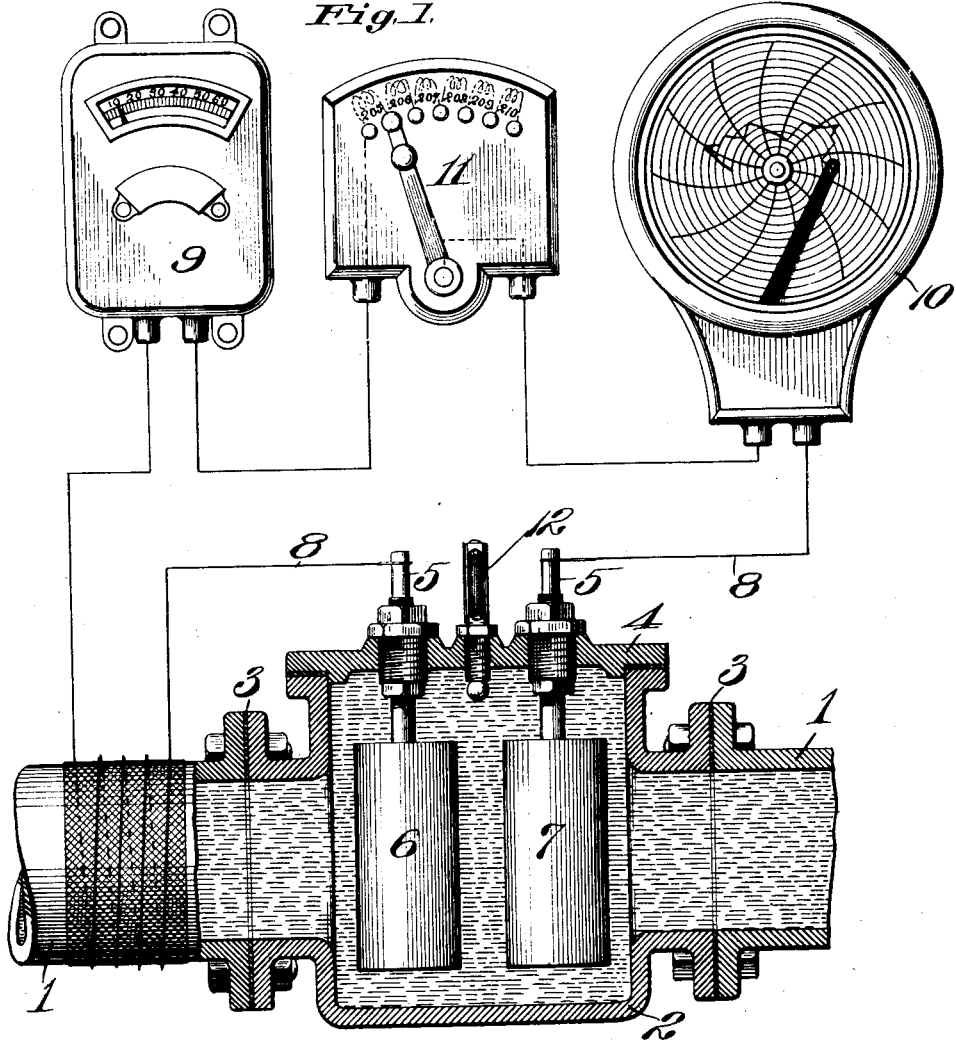
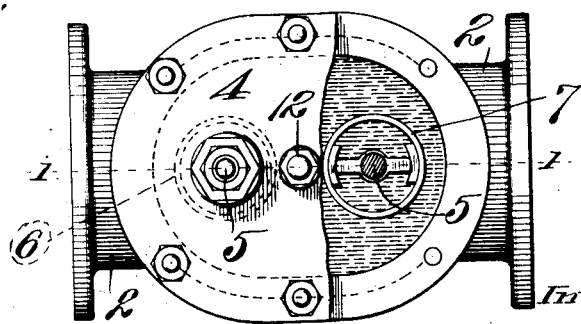

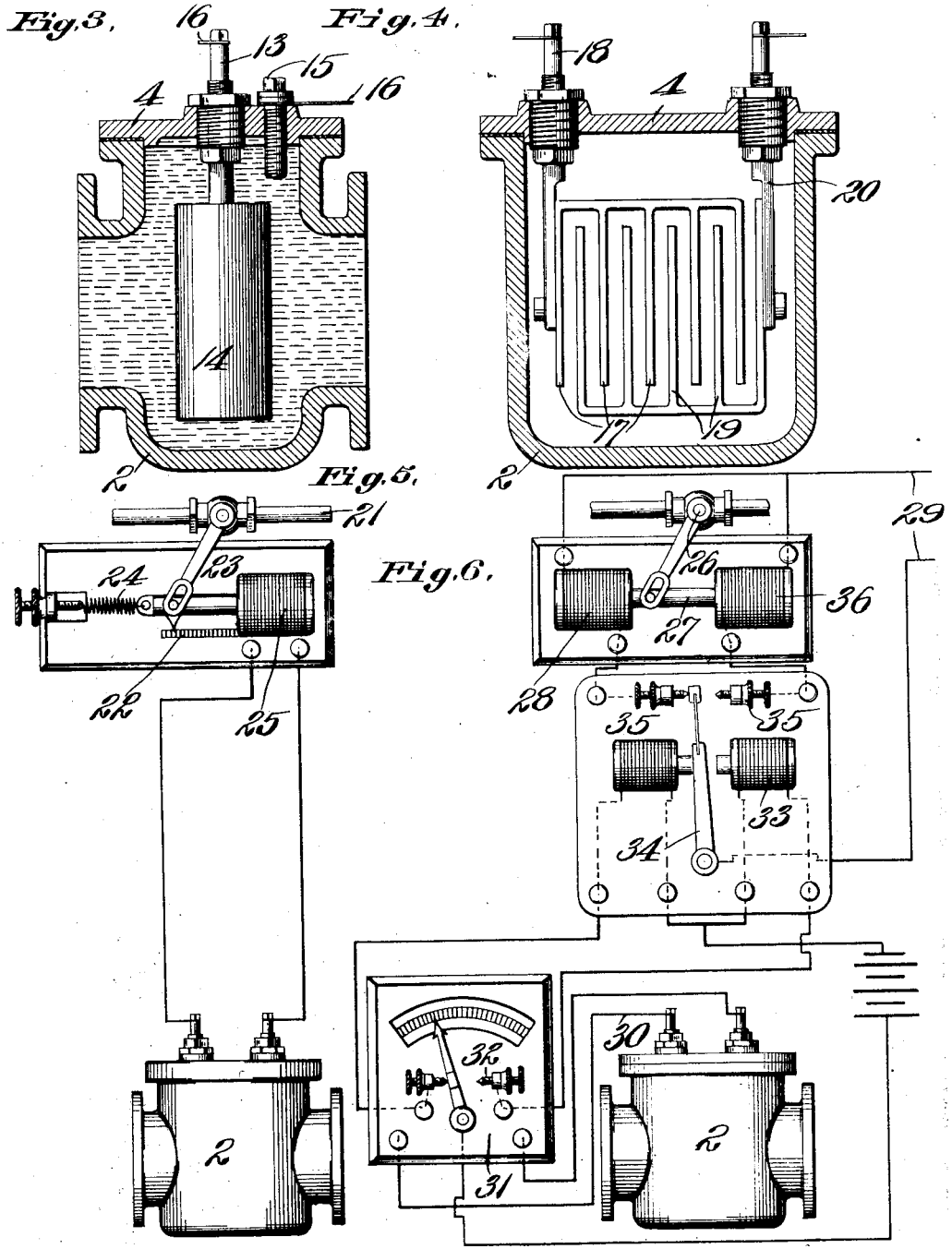

UNITED STATES PATENT OFFICE.

JOHN E. ANGELL, OF ST. LOUIS, MISSOURI.

ELECTRICAL CHEMICAL-TESTING SYSTEM.

1,089,030.  Specification of Letters Patent.  Patented Mar. 3, 1914.

Application filed April 19, 1909. Serial No. 490,955.

*To all whom it may concern:*

Be it known that I, JOHN E. ANGELL, a citizen of the United States, residing at St. Louis, Missouri, have invented a new and useful Electrical Chemical-Testing System, of which the following is a specification.

This invention relates to an electrical chemical testing system, the object being to produce a means, system or apparatus for determining the quality or character of any mixture or solution in liquid form.

In many instances it is possible to accomplish useful results by combining one or more chemicals in definite proportions; for instance, the impurities in water for use in steam boilers, such as calcium and lime, may be precipitated and thus removed by the addition of soda ash in certain definite quantities. Where the chemical or other constituents of the raw water are changing in quantity or character from time to time or where the amount of water required is continually varying, or where both of these conditions are encountered, it has been difficult, or impossible to maintain any definite mixture. To gage accurately and continuously the chemical strength of a solution is a broad object of the present invention.

When two separated electrodes of dissimilar metals, (or one of metal and the other of metalloid, for instance, carbon) are immersed in any corrosive solution, a difference of electrical potential is set up between the two plates. Various theories have been advanced in explanation of this phenomenon but, without attempting an explanation as to the cause, I have found by experiment that an increase in the proportion of the corrosive element results in an increase in the difference of electrical potential between the two electrodes and, conversely, a weakening of the solution has the effect of reducing the electrical potential between the two electrodes.

If the two electrodes above referred to are connected together by an electrical conductor, a current will flow through the conductor from one electrode to the other; and as the flow of current through a conductor of fixed resistance is proportional to the voltage applied at its terminals, it is evident that a suitable instrument connected in the circuit will indicate directly the electrical potential between the electrodes and consequently the strength or quality of the solution into which the electrodes are immersed. It follows that if a solution, in which the proportions of the different elements are known, produces a certain electrical potential between the electrodes as indicated on the instrument referred to above, that the arrangement in question may be made use of where it is desired to produce a like solution without again actually measuring the bulk or weight of the various elements; or, if two or more elements in solution are fed, each at constant or varying rates of feed, into a common pipe the strength of the mixture may be readily determined at all times by inserting into the common pipe the two electrodes above referred to, connected as described to suitable indicating or registering or recording instruments. Furthermore, I have found that in any given solution changes in the temperature have a direct effect on the electrical results; a rise in temperature tending to increase the potential and vice versa. To avoid the necessity of making allowances or corrections in the instrument readings for such changes in temperature, I have found it desirable to insert, at a convenient point in the circuit connecting the two electrodes, a manually adjustable rheostat containing several steps of resistance, each preferably bearing a certain mark corresponding to a temperature, which produces a sufficiently increased electrical activity to offset the effect of the resistance inserted in the circuit, and arranged in such manner that, as the temperature of the solution under test rises, a sufficient resistance to offset the effect of said rise will be introduced into the circuit, the object of course being to exactly offset the effect that such rise in temperature of the solution will have on the electrical potential between the two electrodes.

In addition to the manually adjustable external resistance I have found it desirable also to insert in the circuit connecting the two electrodes a resistance made of a material possessing a temperature co-efficient sufficient to offset the effect of the increased electrical action which results from the higher temperature, in other words, the conductor used would increase in electric resistance, as the temperature rises, to adjust a sufficient extent to reduce the flow of current through the test circuit, so that in the end an accurate indication of the chemical condition of the solution would be shown on the instrument connected in the test circuit regardless of the temperature of the liquid. It is of course necessary to locate this automatic resistance in such close proximity to the liquid under test that the temperature of said liquid will determine the temperature of said resistance. Furthermore, I have found that the current flowing through the circuit connecting the two electrodes may be utilized, to control valves or other suitable mechanisms to regulate the rate or quantity of flow of the various elements which, when combined constitute any desired mixture.

In the drawings, Figure 1 illustrates one form of the invention in connection with a water pipe. Fig. 2 is a top view of a section of the water pipe or container to which this form of the invention is attached. Fig. 3 illustrates a different method of forming a complete circuit through the chemicals in the water. Fig. 4 illustrates a novel form of electrode which may be used with this invention. Figs. 5 and 6 show the supply pipe provided with a valve controlled by the testing apparatus.

A container 1, which may be a water pipe, contains the water which is to be tested to ascertain if the proper mixture is being maintained. The section 2, forming part of the container or pipe, is insulated from the main portion as shown at 3. A removable top or cover 4, closes the section 2 and, in the form shown in Fig. 1, has two posts 5 supported by insulating packing in holes therein. One of the posts 5 supports a zinc electrode 6, while the other carries an electrode 7, of carbon, or copper, or other suitable material. These electrodes are immersed in the water at a slight distance from each other, and out of contact with the walls of the water container. Wires 8 connect with a register 9 and with a recording gage 10 through an adjustable rheostat 11, all of well known electrically operable commercial types. The water containing the suspended elements, such as mineral salts, completes the circuit as stated in the forepart of the specification, and energize the wires, and thereby operate the register and recorder effectively to indicate the density or quality of such solutions. By the register a transitory result is produced which may be observed by the operator, while the recorder produces a permanent record of the density or quality of the fluid at different times.

A thermometer 12 is arranged to protrude through the cover 4 into contact with the water therein and afford means for determining the temperature of the water.

The rheostat is marked to indicate the several steps of resistance therein, these steps of resistance corresponding to certain temperatures. By adjusting the rheostat to the steps and temperatures indicated by the thermometer the resistance in the electrical circuit may be regulated to a degree coordinately with the changing temperature of the water and of the chemical elements in solution in the water, and the wires 8 encircling an insulation covering on the water pipe, as shown in Fig. 1, and subjected, therefore, directly to the heat of said pipe, serve as an automatic temperature compensator between the degrees of resistance fixed by the rheostat, thereby rendering the readings of the indicator and register accurate under all thermic conditions.

In Fig. 3 there is a single post 13 supported in a hole in the cover 4 and having an electrode 14 on its inner end. A post 15 is attached to the cover or to the section 2, between which and the electrode 14 the solutions in the water will complete the circuit, the wires 16 leading to the operating devices.

In Fig. 4 the electrodes comprise a series of plates 17 attached to a terminal post 18, and plates 19 attached to a post 20. The plates are of dissimilar metals, for instance, whereby a difference of electrical potential is set up, and the water flowing between and around these plates produces like effects as in the structure shown in Fig. 1.

The supply of the chemical elements into the liquid to be tested may be automatically regulated in either form or embodiment of the invention. In Fig. 5 the pipe 21 is a chemical supply pipe arranged to deliver the chemicals into the liquid which is to be tested. In said pipe 21 a valve is arranged and is provided with a lever whereby the quantity of chemicals passing through the valve and pipe 21 may be regulated, and said lever operates adjacent to a scale 22 arranged to indicate the quantity of chemical passing through the valve and pipe 21 in the various positions of the valve. Said valve lever is connected to an armature 23, and is normally held in open position by a spring 24 connecting the armature with a stationary element. A magnet 25 is arranged in circuit with electrodes in the container 2, through which the flowing liquid passes after the chemicals are delivered thereinto. An increased quantity of the chemicals in the flowing water passing the electrodes causes the magnet 25 to become strongly energized, and thereby actuate the armature 23 to close, or partially close, the valve which regulates the quantity of chemicals delivered by the pipe 21 into the liquid to be tested. In this manner the valve in the chemical supply pipe operates automatically to permit an increase, or cause a reduction, of the quantity of chemicals passing into the liquid to be tested, in conformity with predetermined requirements.

In the embodiment illustrated in Fig. 6, the chemical supply pipe which is arranged to deliver the chemicals into the liquid to be tested, before the liquid is tested, includes a regulating valve 26 having a lever pivoted to the armature 27 which is actuated in one direction by a magnet 28 in the circuit of the low potential wires 29. The armature 27 when under control of the magnet 28 holds open the valve 26, thereby permitting free passage of the full quanaity of chemicals through the chemical supply pipe. The water into which the chemicals are delivered, after the chemicals pass the valve 26, flows through the container 2 in which the electrodes are supported. Wires 30 from the electrodes in the container 2 pass through the register 31 which indicates the quantity of chemicals contained in the flowing liquid and, when the wires 30 become highly energized, the pointer of the register 31 is thrown into contact with the terminal 32 which is in circuit with a magnet 33. Therefore, when the wires 30 become highly energized because of the presence of a large quantity of chemicals in the flowing liquid, the magnet 33 also becomes energized, and operates an armature 34 into contact with the terminal 35. This results in electrically energizing the magnet 36 which is in circuit with the terminal 35. When the magnet 36 is thus energized the armature 27 is operated thereby. Movement of the armature 27, by the magnet 36 to reduce the quantity of chemicals which may pass said valve, thereby automatically regulates the flow of the chemicals through the supply pipe and into the liquid to be tested.

While I have illustrated a satisfactory embodiment of the invention with a self-contained battery, it will be obvious that there may be variations from the construction and arrangement illustrated and described, without departure from the spirit and scope of the invention. I do not restrict myself to identical features of construction or arrangement, but

What I claim and desire to secure by Letters Patent is:

1. A system for testing water, comprising electrodes or terminals in contact with the water of varying temperature to be tested, a register for indicating the quantity of chemicals in solution in the water, and an electric circuit under control of the temperature of the water connecting said electrodes or terminals with said register effectively to cause said register to indicate the quantity of chemicals in solution under varying conditions of temperature of the water.

2. A system for testing water of varying temperature, comprising electrodes in contact with the water to be tested, an indicator for indicating the quantity of chemicals in solution in the water, and an electrical circuit subjected to the temperature of the water connecting said electrodes with said indicator, substantially as specified.

3. In a water testing system the combination with a container for containing the water to be tested, of electrodes arranged to contact with the water in said container, and an indicating, and a recording device in circuit with said electrodes operable effectively to indicate and record the quantity of chemicals in said water, substantially as specified.

4. In a water testing system the combination with a container for containing the water to be tested, of electrodes arranged to contact with the water in said container, an electrical circuit connecting said electrodes, an indicating device in said circuit for indicating the amount of chemicals in the water under test, a manually operable temperature compensator in said circuit, and a supplemental automatically operable temperature compensator also arranged in said circuit, substantially as specified.

5. In a water testing system the combination with a container for containing the water to be tested, of electrodes extending into said container and arranged to contact with the water therein, an electrical circuit connecting said electrodes, a device in said circuit for indicating the amount of chemicals in the water under test, and means in said circuit for coördinating the resistance thereof with the temperature of the liquid in said container, substantially as specified.

6. A water testing device comprising a voltic circuit terminating in electrodes arranged to contact with the water to be tested, an indicating device in said circuit electrically controlled by the amount of chemicals in the water in which the electrodes are immersed, and means for varying the resistance of said circuit as required by varying temperature of the water, substantially as specified.

7. In a water testing system, the combination with a container for containing the water to be tested, of electrodes extending into said container and arranged to contact with the water to be tested, an electrical circuit connecting said electrodes, a device in said circuit for indicating certain conditions of the water, and temperature compensators in said circuit for coördinating the resistance of the circuit with the temperature of the water in said container, substantially as specified.

In testimony whereof, I hereunto affix my signature to this specification this 17 day of April 1909, in the presence of two witnesses.

JOHN E. ANGELL. [L. S.]

Witnesses:
J. D. RIPPEY,
L. C. KINGSLAND.